UNITED STATES PATENT OFFICE.

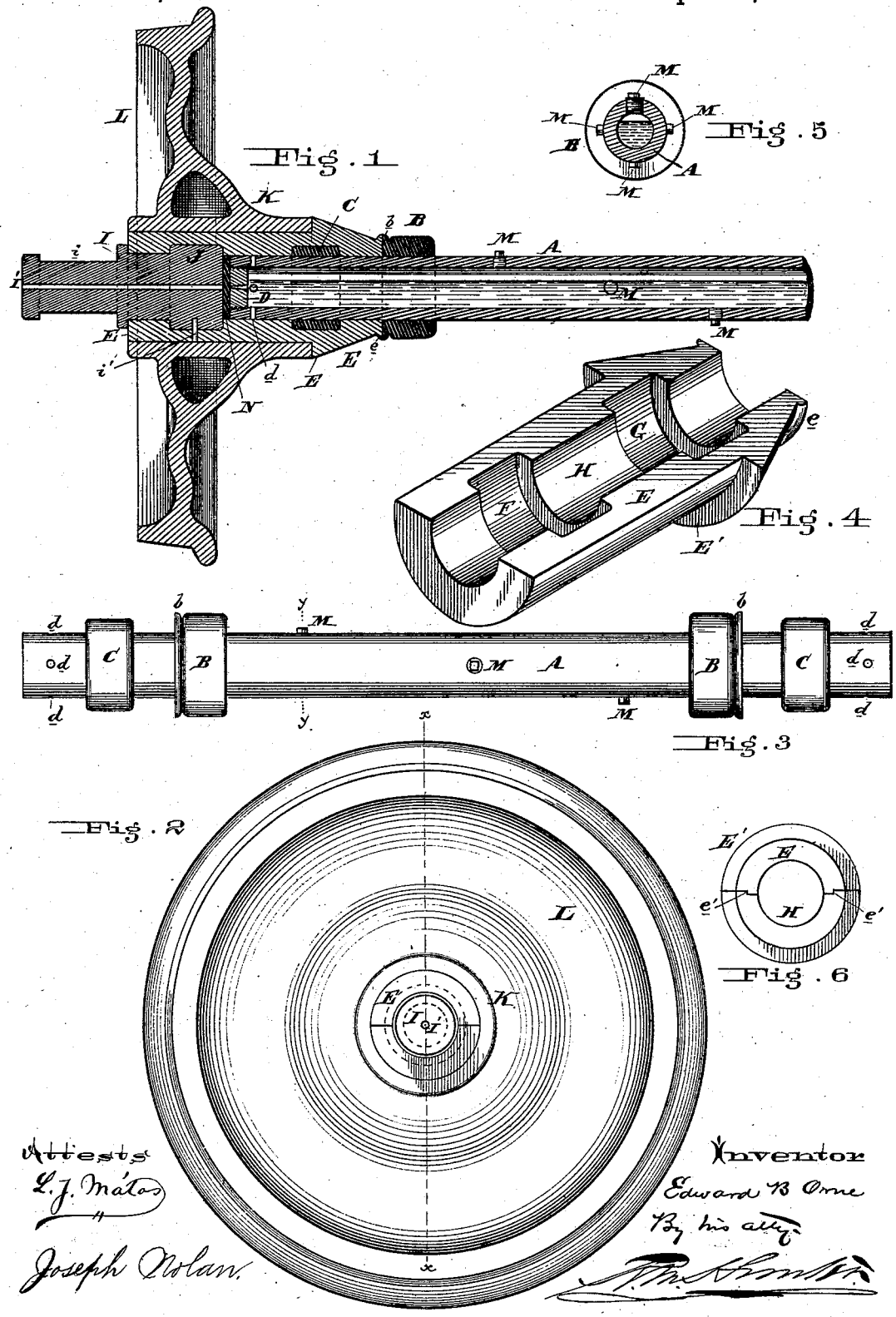

EDWARD B. ORNE, OF PHILADELPHIA, PENNSYLVANIA.

CAR-AXLE.

SPECIFICATION forming part of Letters Patent No. 264,474, dated September 19, 1882.

Application filed May 22, 1882. (No model.)

*To all whom it may concern:*

Be it known that I, EDWARD B. ORNE, of the city and county of Philadelphia, and State of Pennsylvania, have invented an Improvement in Car-Wheel Axles, of which the following is a specification.

My invention has reference to car-wheels and their axles; and it consists in providing a hollow axle with rigid collars upon each end, said collars being adapted to retain in position a split bearing, which supports and carries rigidly secured to it the main bearing, which works in the usual axle-box, the said split bearing being clamped by the wheel-hub; and in minor details of construction, all of which are more fully set forth in the following specification and shown in the accompanying drawings, which form part thereof.

The object of my invention is to facilitate the passage of railroad-wheels under cars around curves, and to overcome the resistance occasioned by the circumferential slipping on the rails by the wheels, as is the case with rigid wheels and axles now in general use.

In the drawings, Figure 1 is a sectional elevation, on line $x\ x$, of part of my improvement. Fig. 2 is a side elevation of same, looking in a line with the center of the axle. Fig. 3 is an elevation of the center part of the axle. Fig. 4 is a perspective view of one-half of the core or split bearing. Fig. 5 is a cross-section of the axle on line $y\ y$, and Fig. 6 is an end view of the core.

The wheels L may be of any desired pattern, but are made larger at the hub K, this extra size of hub being necessary to receive the core or split bearing E, which is a cylindrical iron or steel bed, made in two horizontal halves, with edges planed or grooved, as at $e'$, to fit each other, and which, when placed together, form a round core adapted to be pressed by hydraulic or other power into the hub K, the flange or rim E' arresting the hub at the proper place. The internal formation of this core E is shaped to fit the collars C J and bodies of hollow axle A and end section, I, by being provided with annular grooves G F and aperture H. The collars B and C are heated and shrunk on the ends of the hollow axle or center part, A, which may be turned up to receive them.

The "axle," broadly, is divided into three sections or lengths, comprising one center part, A, and two end sections, I. The hollow center part, A, is made of wrought iron or steel, and rests in the end of each of the cores E in the wheels L, and which, with the steel or wrought-iron collars C B, that are shrunk on it, keep the wheels L to gage and in proper position.

The two iron or steel collars on each end of the axle A are arranged one outside and one inside the core E, as shown in Fig. 1.

There are four small screw-plugs, M, in different parts of the axle A, said plugs being arranged equidistant about the circumference of the said axle, and are used to fill the axle with oil, and by their arrangement one of the plugs will always be up.

The ends of the hollow axle A are closed by screw-plugs D, and inside the screw-plugs and through the pipe forming the axle A, at each end, are bored holes $d$, through which the oil flows to lubricate the axle inside the cores E.

The end sections, I, of the axle proper are made of steel or wrought-iron and rest in the cores E, by which they are firmly clamped, the ends projecting and forming the bearings $i$ for the brasses of the axle-boxes, which are the same as are now in general use. These end sections, I, of the axle are firmly secured to the cores E and prevented from turning therein by pins $i'$ of sufficient length and size, which pass through the outside of the core E into the end sections, I. These pins are put in place before the cores are pressed into the wheel, and therefore when the said cores are in position they cannot work out.

The bearing $i$ is lubricated in the same manner as are the bearings in the rigid axle now in general use, and, in addition thereto, a channel, $l'$, is bored through the center of each end section, I, of axle, by which oil or other lubricant may pass to lubricate the independent axle A inside the core E. The inner ends of these end sections, I, are provided with solid collars or flanges J, which fit into the annular grooves F in the cores E, and by which they are prevented from working out.

Between the end of the center section, A, and end sections, I, of axle are steel disks N, which are used to prevent any undue wear of these parts.

I do not limit myself to the exact construction of the parts shown, as they may be modified in various ways without departing from my invention.

The collars B and ends of cores E are provided with rims $b$ $e$, which prevent any escaping oil from spreading upon the axle, collars, hubs, or cores.

If desired, one end of axle A may be rigidly attached to one wheel, L, and have a bearing, $i$, formed on its end.

Having now described my invention, what I claim as new, and desire to secure by Letters Patent, is—

1. In a car-wheel axle, two car-wheels having bearings upon their outer sides for the axle-boxes of the car, in combination with a center part or axle made hollow and loosely journaled in each of said car-wheels, said hollow axle being provided with means to admit a lubricant, and holes to allow said lubricant to flow from said axle to its journals in the wheels, substantially as and for the purpose specified.

2. An axle made of a center and two end sections, in combination with split cores arranged to firmly clamp the end sections and form bearings for the center sections and wheels, the hubs of which clamp the two parts of the cores together, substantially as and for the purpose specified.

3. The center part, A, provided with collars C upon its ends, in combination with split cores E, having grooves G F, end sections, I, having bearings $i$, and wheels L, having hubs K, substantially as and for the purpose specified.

4. The center part, A, made hollow, and provided on its ends with collars and plugs, split cores E, having grooves G F, end sections, I, having bearings $i$, and wheels L, having hubs K, substantially as and for the purpose specified.

5. The hollow center part, A, closed on its ends and provided with holes $d$, collars B C, and plugs M, in combination with cores E, made in two parts, and having grooves G F, end sections, I, having flange J, bearings $i$, and channel I', and wheels L, having hubs K, substantially as and for the purpose specified.

6. The combination of hollow axle A, having collars B C, closed end plugs D, and holes $d$, cores E, having grooves G F, and made in halves, end sections, I, having flanges J, and bearings $i$, disks N, and wheels L, having hubs K, substantially as shown.

7. A car-wheel axle made hollow and provided with a series of closed apertures arranged about its circumference to fill it with a lubricant, substantially as and for the purpose specified, in combination with loose wheels upon one or both of its ends.

In testimony of which invention I hereunto set my hand.

EDWARD B. ORNE.

Witnesses:
R. M. HUNTER,
R. S. CHILD, Jr.